Feb. 6, 1923.
H. E. GROSSENBACHER.
CORN POPPER.
FILED MAY 5, 1921.
1,444,244.
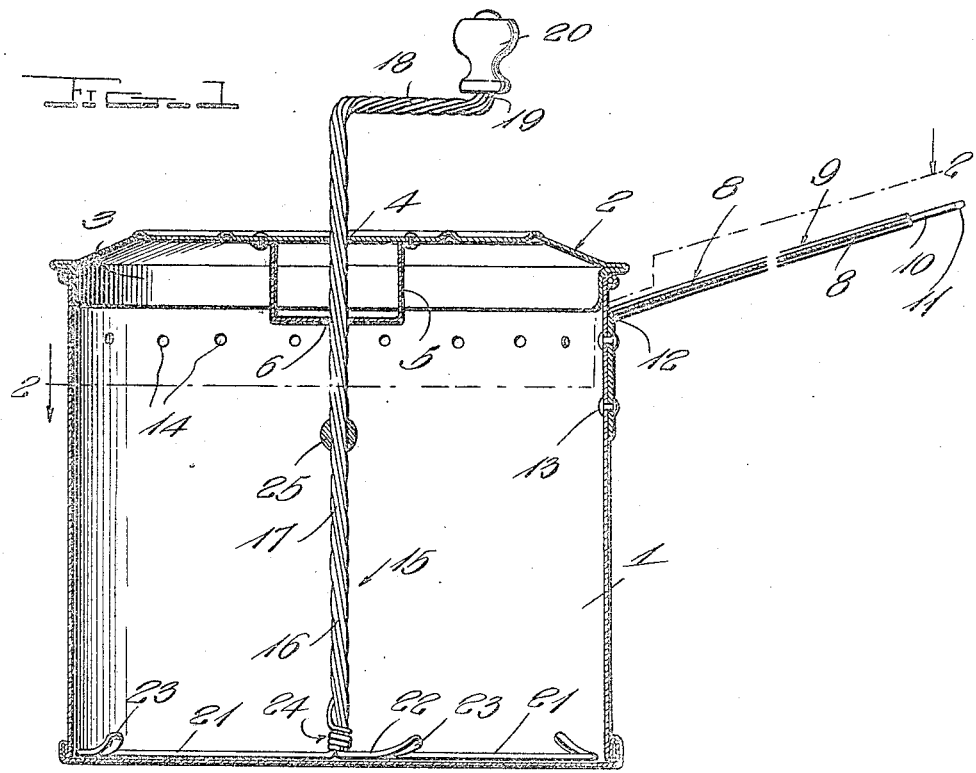
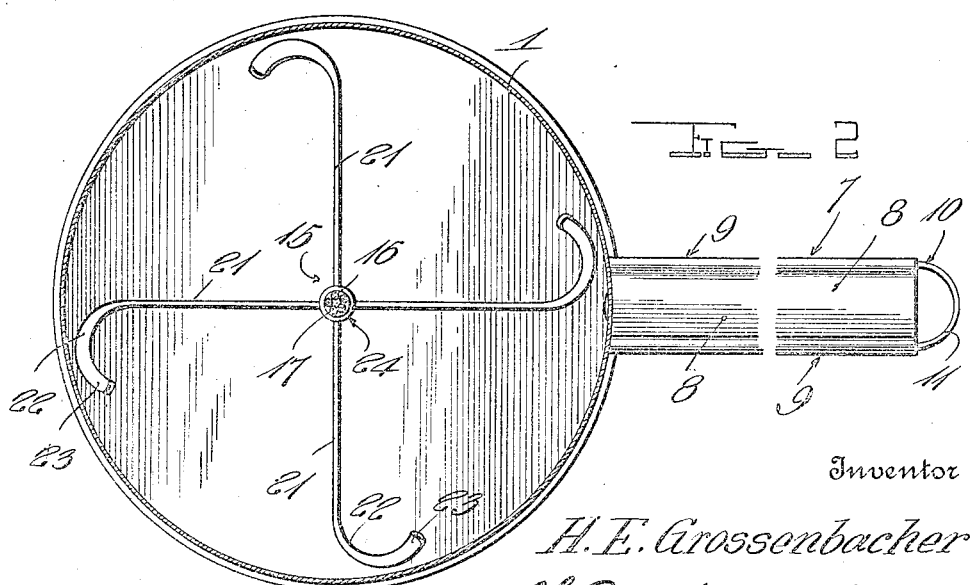
Inventor
H. E. Grossenbacher
By
Attorneys Patented Feb. 6, 1923.

1,444,244

UNITED STATES PATENT OFFICE.

HENRY E. GROSSENBACHER, OF OVERLAND, MISSOURI.

CORN POPPER.

Application filed May 5, 1921. Serial No. 467,067.

*To all whom it may concern:*

Be it known that I, HENRY E. GROSSENBACHER, a citizen of the United States, residing at Overland, in the county of St. Louis and State of Missouri, have invented certain new and useful Improvements in Corn Poppers; and I do declare the following to be a full, clear, and exact description of the invention, such as will enable others skilled in the art to which it appertains to make and use the same.

This invention relates to an improved corn popper, and it has for one of its objects to generally improve upon devices of this class by the provision of one of extreme simplicity and durability which is practical, effective in operation, light in weight, easy to manipulate and possesses many features over prior patented and marketed poppers.

Another and very important object of the invention is to provide a corn popping device embodying a novel agitator for the corn, said agitator including a plurality of radial horizontally disposed stirrer-arms provided at their outer ends with means for throwing the corn toward the center of the container to evenly distribute it over the bottom of the latter and prevent scorching or possible burning of the corn, also reducing the time required for popping the corn to a minimum.

Another and important feature and object of the invention is to provide a corn popping device embodying the aforesaid type of agitator, the outer ends of the arms being laterally bent and having their extremities flattened and turned upwardly so as to not only accomplish the above result, but also to assist in turning the corn over and over to prevent possible burning and to help in cooking the latter in a short time.

Still another object of the invention is to provide a corn popper embodying a container and an agitator, the latter being associated with the cover of the container in such a way as to serve as a handle for the cover, obviating the necessity of providing a special handle for this purpose.

Other objects and advantages of the invention will be apparent during the course of the following description.

In the accompanying drawings forming a part of this specification and in which like numerals are employed to designate like parts throughout the same:

Figure 1 is a central vertical sectional view of a corn popper constructed in accordance with this invention.

Figure 2 is a sectional view taken on the irregular line 2—2 of Fig. 1.

In carrying out the invention, I employ a light-weight sheet metal container 1 of suitable size and shape, the same being open at its top and a removable cover 2 being employed to close this end of the container. The cover includes, as is shown, an annular depending flange or rim 3 which extends into the upper open end of the container and snugly fits the inner wall of the latter to hold the cover in place at all times, even when the container is shifted back and forth over the fire. Here, it may be stated that the cover is formed with a central opening 4 which serves a purpose to be hereinafter described and it is equipped on its inner face with a suitable guide and bracing member 5 which is provided with an opening 6 directly beneath the opening 4, this member 5 likewise serving a purpose to be hereinafter set forth. At this point, I also wish to direct attention to the fact that the container is equipped with a suitable handle 7 to assist in handling the device. While this handle may be of any other construction, I prefer to use the type shown. The construction thereof can better be seen in Fig. 2, wherein the numeral 8 designates a sheet metal plate which has its opposite longitudinal edge rolled as indicated at 9, a bent wire rod 10 being passed through the rolled edges and having its intermediate portion 11 extending beyond the plate to form a loop, whereby the device may be suspended from a nail or other support on the wall or dresser. The plate and wire are bent intermediate their ends as indicated at 12 and this laterally bent portion is riveted or otherwise secured as indicated at 13 to the container. Before going further with the detailed description, it may be well to state that the container, as is usual, is equipped near its top or at any other suitable point, with a plurality of circumferentially spaced air holes 14 which serve as vents, as is obvious.

As before indicated the invention in addition to embodying the parts already described, includes a novel agitator, indicated as a whole, by the numeral 15. This agitator in order to render it inexpensive to manufacture and novel in construction, is made from a plurality of wires 16 which are twisted about one another as shown to provide a vertical shaft 17 which extends rotatably and slidably through the aforesaid openings 4 and 6. This shaft is bent laterally as indicated at the points 18 and 19, and a wooden or other kind of a knob 20 is secured, in any suitable way, on the left-hand portion 19. Here, it is to be pointed out that while there may be more or less wires, I prefer to use five and to bend the lower ends of four of these radially as indicated to provide spaced horizontally extending stirrer-arms 21. It is to be noted that these arms are of a greater length than the radius of the container and the ends thereof are bent in the same direction as indicated at 22 to form hooks, and the extremities of these laterally bent ends are flattened and directed upwardly as indicated at 23. With this construction, it will be seen that the corn will be raked inwardly toward the center of the container when the agitator is set into rotation. Not only this, the flattened upturned ends 23 serve, to a certain extent, to turn the corn over and over to cause it to cook more quickly and to prevent possible burning thereof as may otherwise occur. As before stated, only four of these wires are bent to provide stirrer-arms. The remaining wire is cut short and is wrapped about the already twisted wires as indicated at 24 to prevent possible untwisting of the other wires. It is yet to be pointed out that the shaft 17 of the agitator may or may not be equipped intermediate its ends with a suitable stop 25 which serves to limit the upward sliding movement of the shaft by coming into contact with the guide 5. The agitator by having this limited upward movement, becomes a part of the cover and guide and is therefore removable from the container when the cover is removed. It will be seen that by grasping the exposed portion of the shaft in any suitable way and exerting an upward pull, the stop 25 wil be brought into contact with the guide 5 and a further pull will serve to remove the cover. Hence, it will be seen that the agitator constitutes a handle for the cover, thus obviating the necessity of employing a special handle as would otherwise be necessary.

In use, the container 1 is placed over a fire or other heat forming means and, by use of the handle, is reciprocated in the usual way, it being obvious that corn, is, of course, first placed into the container before this is done. Holding the handle 7 with one hand and grasping the knob 20 with the other hand, the agitator is rotated in the openings 4 and 6. In so doing, the arms 21 are scraped successively over the bottom of the container tossing the corn about and throwing the greater portion thereof toward the center of the container. From practical experience, I have found out that by throwing the corn toward the center, it becomes evenly distributed over the bottom of the container and there is little or no possibility of the same burning. Even distribution, of course, assists in enabling the corn to be cooked in the minimum amount of time. Also, the upturned flattened ends of the arms serving to turn the corn over and over help in accomplishing this end. After the corn is cooked to the desired degree, the cover is removed in the way above suggested and the corn poured out of the container and the latter is re-filled and the operation repeated.

The reader will, no doubt, by carefully considering the foregoing description in connection with the drawings, be able to obtain a clear understanding of the invention. In view of this, a more lengthy and detailed description is deemed unnecessary.

Since probably the best results may be obtained with the arrangement herein shown and described, this is taken as a preferred embodiment of the invention. However, slight minor changes coming within the scope of the subjoined claims may be resorted to.

I claim:

1. A corn popper comprising a container with a rotary agitator therein, said agitator being formed from a plurality of wires twisted around one another to provide a vertical shaft, the lower ends of said wires being bent at right angles to this shaft to provide a plurality of radial horizontally disposed stirrer-arms, the outer ends of said arms being bent to form hooks, and said hooks being flattened horizontally with the extremities upturned to assist in turning the corn over and over and throwing it toward the center when the agitator is rotated, one of said wires being wrapped around the remaining twisted wires at the juncture of the arms and shaft to prevent untwisting of the wires.

2. In a device of the class described, a rotary agitator comprising a vertical shaft equipped on its lower end with a plurality of right angularly disposed radiating arms, the outer ends of which are bent to form substantially semi-circular hooks, said hooks being flattened and being gradually increased in width from their inner to their outer ends, approximately one half of the last named portions of the hooks being upturned to assist in turning the corn over and over during the rotation of the agitator.

In testimony whereof I have hereunto set my hand.

HENRY E. GROSSENBACHER.